United States Patent [19]
Fue et al.

[11] Patent Number: 5,500,682
[45] Date of Patent: Mar. 19, 1996

[54] MEMORY EQUIPMENT FOR WRITING/READING A DEFECTIVE VIDEO SIGNAL IN A FIFO MEMORY DEVICE CONSECTIVELY

[75] Inventors: Kouichirou Fue, Takatsuki; Yosuke Izawa, Ibaraki; Naoji Okumura, Minou, all of Japan

[73] Assignee: Matsushita Electric Industrial Co., Ltd., Osaka, Japan

[21] Appl. No.: 386,134

[22] Filed: Feb. 6, 1995

Related U.S. Application Data

[63] Continuation of Ser. No. 113,690, Aug. 31, 1993, abandoned.

[30] Foreign Application Priority Data

Sep. 4, 1992 [JP] Japan ................................. 4-237080

[51] Int. Cl.⁶ ................................................. H04N 5/95
[52] U.S. Cl. .................... 348/497; 348/575; 348/505; 360/36.1
[58] Field of Search ................................. 348/505, 497, 348/575; 360/36.1, 36.2; H04N 5/95, 5/89

[56] References Cited

U.S. PATENT DOCUMENTS

| | | | |
|---|---|---|---|
| 4,612,568 | 9/1986 | den Hollander et al. | 348/505 |
| 5,280,396 | 1/1994 | Hamaguchi et al. | 360/36.1 |

FOREIGN PATENT DOCUMENTS

| | | | |
|---|---|---|---|
| 0391784 | 10/1990 | European Pat. Off. | H04N 5/907 |
| 2541841 | 8/1984 | France | H04N 7/16 |
| 3742514 | 7/1988 | Japan | H04N 5/907 |
| 02039279 | 2/1990 | Japan | H04N 5/907 |
| 3-42980 | 2/1991 | Japan | H04N 5/95 |
| 04048884 | 2/1992 | Japan | H04N 5/907 |

Primary Examiner—James J. Groody
Assistant Examiner—Cheryl Cohen
Attorney, Agent, or Firm—Willian Brinks Hofer Gilson & Lione

[57] ABSTRACT

The invention relates to a video signal memory equipment comprising a FIFO memory for storing video data of video signals, and a control unit for controlling writing and reading in the FIFO memory, wherein the control unit receives a horizontal synchronizing signal of video signal in video data writing action, writes a specified number of video data from the beginning of video data of brightness signals of the horizontal scanning period sequentially into the FIFO memory, and reads out the specified number of video data upon every input of horizontal synchronizing signal, in video data reading action, in the written sequence as video data of that horizontal scanning period, thereby storing and producing the video data of video signals, whereby video data of each horizontal scanning period of video signals are continuously written into the FIFO memory by every specified number of pieces from the beginning, and are read out by every specified number of pieces upon every input of horizontal synchronizing signal, and hence the video data of video signals can be read out by dividing in every horizontal scanning period, and therefore the address generating device for dividing the data in every horizontal scanning period is not needed in this video signal memory equipment.

1 Claim, 4 Drawing Sheets

ENABLE PULSE

RANGE VISIBLE IN ACTUAL SCREEN

POSITION OF HORIZONTAL SYNCHRONIZING PULSE

MEMORY EQUIPMENT FOR WRITING/READING A DEFECTIVE VIDEO SIGNAL IN A FIFO MEMORY DEVICE CONSECTIVELY

This is a continuation application of application Ser. No. 08/113,690 filed Aug. 31, 1993, now abandoned.

BACKGROUND OF THE INVENTION

1. Field of the Invention

The present invention relates to a video signal memory equipment for storing video data of non-standard video signal in a first in first out (FIFO) memory.

2. Description of the Related Art

Recently, various effects are realized on the screen by signal processing of video information. In this case, the means for storing once the video signal in the memory, and then processing the stored video information is widely employed.

Signal processing of video information is generally done on the video data sampling the video signal by the clock synchronized with the burst signal clock, that is, the clock locked in burst signal clock. After detecting the starting point of video signals of one screen by the input of a vertical synchronizing signal, the starting point of brightness signals is detected by the successive input of horizontal synchronizing signal, and from that moment the brightness signals are sequentially sampled by the clock locked in burst signal clock to obtain the image data for one screen, and the image data are sequentially written into the memory. In this case, there are standard video signals of which relative positions of vertical synchronizing signals and horizontal synchronizing signals and the signal width are standard as defined as the broadcasting method, and defective video signals, such as video signals reproduced from a video tape recorder. The video signals reproduced from a video tape recorder often become defective video signals by operation fluctuations of mechanical elements. The number of video data that can be obtained by sampling the video signals by the clock locked in burst signal clock of 4 fsc (fsc: burst signal clock frequency) varies in a range of about 910±30 in the NTSC system, and 135±30 in the PAL system,in one horizontal scanning period of non-standard video signals.

Therefore, for example, when synthesizing a screen 1 and a next screen, or when synthesizing a screen of non-standard video signals on a screen of standard video signals, since the number of data in the horizontal scanning period varies between two screens, the video data do not correspond to each other correctly. FIG. 7 is a schematic diagram in which video data of one screen of defective video signals fluctuating in the interval of horizontal synchronizing signals are sequentially written into a memory, the number of video data in one horizontal scanning period is 910, which are sequentially read out, and caused to correspond to the video data of one screen of standard signals of which number of video data in one horizontal scanning period is 910 in all cases. As known from the diagram, when video data are processed between two screens, an effect of horizontal synchronizing signal waveform appears in the image, and a defect is formed on the image. To solve such problem, by using the means for dividing the video data in every horizontal scanning period, writing into the memory and reading out in every horizontal scanning period, as shown in FIG. 7(b), every video data is reproduced so as to correspond to the original positions sampled in the horizontal scanning period.

To realize such video signal memory equipment, the means for dividing the video data in every horizontal synchronizing signal by the address, writing into the memory and reading out is employed.

The conventional video signal memory equipment performing in such manner is explained below. FIG. 6 is a block diagram of constitution of a conventional video signal memory equipment using the field memory for input and output of data by address. In the diagram, numeral 6 is an address generating circuit for generating writing or reading address of a field memory 7 on the basis of an input horizontal synchronizing signal, and 7 is a field memory for writing or reading data according to the address.

Thus composed video signal memory equipment operates as follows. The address generating circuit 6 generates addresses in the Y-axis direction (Y-addresses) corresponding to the numbers of the horizontal scanning periods, and addresses in the X-axis direction (X-addresses) corresponding to the numbers of video data on the horizontal scanning period, and a set of Y-address and X-address is produced as address q to the field memory 7 by parallel data of plural bits. For example, supposing the Y-addresses in each horizontal scanning period to be Y1, Y2, ... and the X-addresses of each video data in the horizontal scanning period to be X1, X2, ... the address generating circuit 6, after detecting the start of video signal of one screen by the input of a vertical synchronizing signal, with Y-address being Y1, counts up the X-address from X1 to X2, ... sequentially in ever clock from the input moment of the horizontal synchronizing signal, while the field memory 7 sequentially writes the video data of horizontal scanning period according to the address. The address generating circuit 6 returns the X-address to X1 on the input moment of next horizontal synchronizing signal, and starts to count up X1, X2, ..., and with the Y-address being Y2, the field memory 7 writes sequentially the video data of the horizontal scanning period according to the address. In this way, the video data for one screen are written into the field memory 7. When reading out the video data stored in the field memory 7, the address generating circuit 6 counts up the Y-address from Y1 to Y2, ... on every input of horizontal synchronizing signal, and at every Y-address, moreover, the X-addresses are generated sequentially as X1, X2, ... , and the field memory 7 produces the image data in each horizontal scanning period according to the address.

In this way, by writing and reading by dividing the video data of each horizontal scanning period in every horizontal scanning period, as shown in FIG. 7(b), it is reproduced so that the video data being readout corresponds to the sampling sequence of each horizontal scanning period, and corresponds to the video data of other video signals.

In such conventional constitution, however, the address generating circuit 6 is necessary, and many connection pins are needed in order to transmit the address q, which resulted in a large circuit size.

It is hence a primary object of the invention to solve the problem by presenting a video signal memory equipment small in a circuit size.

SUMMARY OF THE INVENTION

Preferably, the video signal memory equipment of the invention comprises a first in first out (FIFO) memory for storing video data of video signals, and a control unit for controlling writing and reading in the FIFO memory, wherein the control unit receives a horizontal synchronizing signal of video signal in video data writing action, writes a specified number of video data from the beginning of video data of brightness signals of the horizontal scanning period sequentially into the FIFO memory, and reads out the specified number of video data upon every input of horizontal synchronizing signal, in video data reading action, in the written sequence as video data of that horizontal scanning period, thereby storing and producing the video data of video signals.

In this constitution, the video signal memory equipment of the invention operates as follows. In the FIFO memory, the video data of brightness signals in each horizontal scanning period of video signals are sequentially written by the specified number of pieces from the beginning, and are read out the specified number of pieces in the written sequence of video data in every horizontal synchronizing signal.

Therefore, in the video signal memory equipment of the invention, a sufficient quantity of video data can be stored from the beginning of brightness signals of each horizontal scanning period, and the video data can be divided and read out in every horizontal scanning period. At the same time, the circuit size can be reduced because the address generating circuit is not used. Needless to say, It can be applied to the NTSC and PAL television systems only by changing the number of video data to be stored.

DESCRIPTION OF THE PREFERRED EMBODIMENTS

Figure 1:
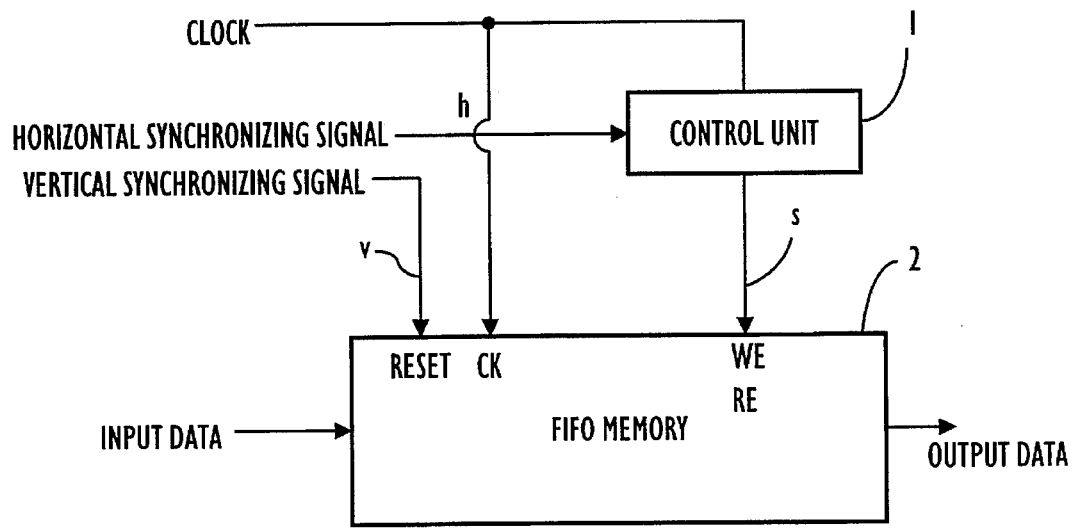
FIG. 1 is a block diagram showing a constitution of an embodiment of a video signal memory equipment of the invention.

FIG. 1 is a block diagram showing a constitution of an embodiment of a video signal memory equipment of the invention. In the diagram, numeral 1 denotes a control unit for controlling the writing and reading actions of FIFO memory 2, and it receives, in data writing action, a vertical synchronizing signal v, and produces a control signal s to the FIFO memory 2 as write enable pulse in synchronism with the horizontal synchronizing signal h, thereby controlling the number of data of one horizontal scanning period to be written in the FIFO memory 2 to a specified number, and receives, in data reading action, a vertical synchronizing signal v, and produces a control signal s to the FIFO memory 2 as read enable pulse in synchronism with the horizontal synchronizing signal h, thereby controlling the number of data to be read out in every horizontal scanning period to a specified number; and number 2 is the FIFO memory for writing the data sequentially, and producing the data in the written sequence by the control of the control unit 1, and it receives a vertical synchronizing signal v to reset it to be set in the first address of writing or reading, receives a control signal s as write enable pulse or read enable pulse, and writes or reads the input data sequentially in every clock CK while the signal s is in active state. In this embodiment, one piece of video data is supposed to be composed of $\phi$ bits.

Figure 2:
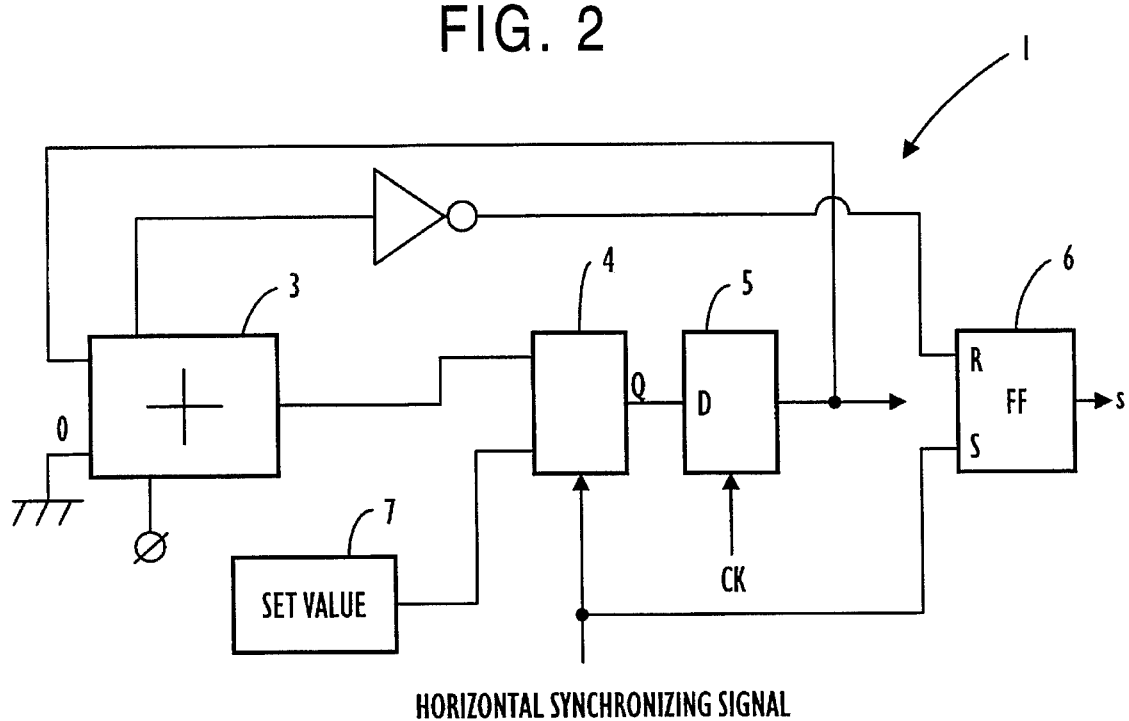
FIG. 2 is a block diagram showing a constitution of a control unit in an embodiment of the invention.
Figure 7:
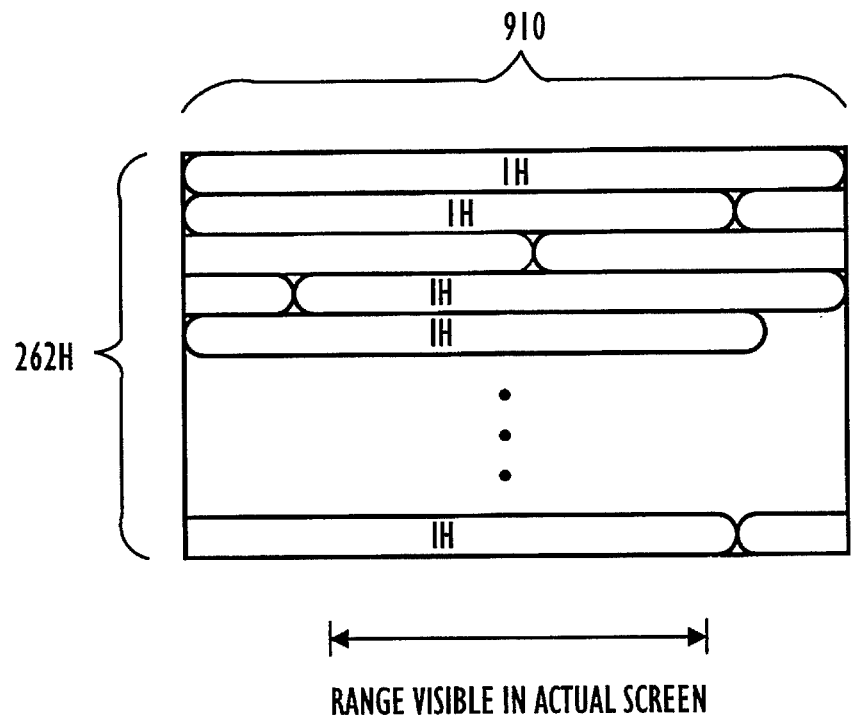
FIGS. 7(a) and (b) are schematic diagrams showing the corresponding relation of video data of standard video signals and video data of defective video signals.
Figure 7:
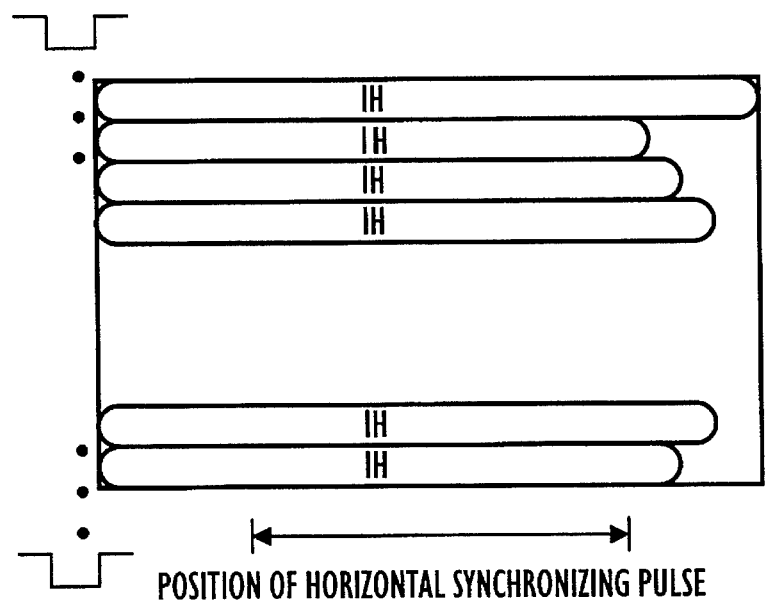

FIG. 2 is a block diagram showing a constitution of the control unit 1 in FIG. 1. In the diagram, numeral 3 denotes an adder for adding up the number of bits $\phi$ per video data upon every output pulse of a D-flip-flop 5, and indicating the final bit of the final video data to be recorded or read out in synchronism with the horizontal synchronizing signal, and 4 is a counter for starting counting up from a specified set value upon every input of horizontal synchronizing signal h, and counting up to the full count, and it stops when counting up to the full count, and is reset by the input of next horizontal synchronizing signal to start counting up again from the set value, and one count thereof corresponds to one piece of video data. Numeral 5 denotes a D-flip-flop (D-FF) for shaping the waveform of the output of the counter 4 by a clock CK, 6 is an RS-flip-flop (RS-FF) for producing a control signal s, and 7 is a register for storing the set value preliminarily according to the televlslon system. The set value is a numerical value for limiting the number of pieces of video data in one horizontal scanning period, and in this embodiment it is specified so that the number of counts from the set value to the full count counted by the counter 4, that is, (the full count number—set value) may be equal to the number of pieces of video data. Meanwhile, as shown in FIG. 7(b), since the range of the horizontal direction actually seen on the screen is narrower than the horizontal scanning period of the video signals, the number of pieces of video data to be stored is set to be larger than the number of pieces of video data in the visible range, and smaller than the number of pieces of video data of standard video signals.

this constitution, the video signal memory equipment of the invention operates as follows. First, the memory action is explained. Initially, the counter 4 is in reset state, and the set value is determined as the initial value of the count when reset. By the input of a horizontal synchronizing signal, the RS-FF 6 becomes active, and its output, that is, the control signal s also becomes active, while the counter 4 starts to count up from the set value. On the other hand, the FIFO memory 2 receiving the control signal s as write enable signal continues to write video data in bit units sequentially in every clock CK from the moment the control signal s becomes active. In this process, the D-FF 4 shapes the waveform of the output Q of the counter 4 by the clock CK, and sends out to the adder 3, and the adder 3 adds up the specified number of bits $\phi$ per video data in every one count, and when the counter 4 reaches the full count and stops counting, and the added total reaches the numerical value corresponding to the final bit of the final video data, a carry signal is sent to the RS-FF 6, and the control signal s is made negative. At this moment, the FIFO memory 2 is set in disabled state for writing, and writing of video data is stopped. As a result of this operation, the video data of a specified number of pieces from the beginning of the horizontal scanning period are sequentially written into the FIFO memory 2, and the subsequent remaining video data are not written into the FIFO memory 2.

Figure 3A:
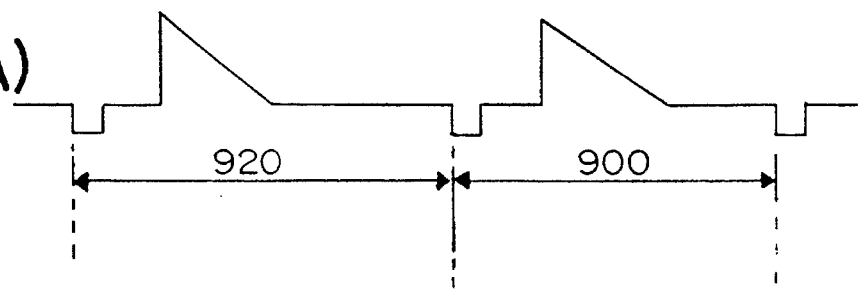
FIGS. 3(a) to (c) are timing charts showing a memory action of video signal memory equipment in an embodiment of the invention.
Figure 3B:
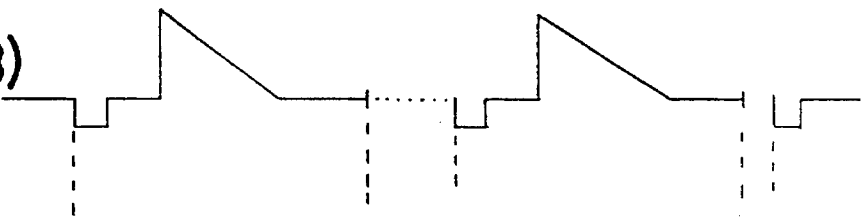
Figure 3C:
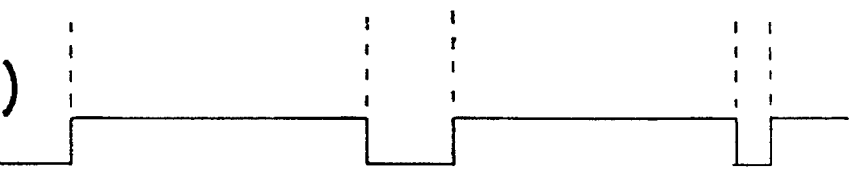

FIG. 3 is a timing chart showing this operation. The waveform A shown in FIG. 3(a) is a waveform of brightness signal of defective video signal, and, although not shown, the video data by sampling the waveform A by the clock locked in burst signal clock is formed correspondingly to the waveform A. The numeral given to the axis of abscissas of the waveform A represents the number of pieces of video data in every horizontal scanning period. The waveform B shown in FIG. 3(b) shows the video signal waveform in a range of the number of pieces of video data reaching from the beginning of horizontal scanning period to the specified value. The waveform in FIG. 3(c) shows a write or read enable pulse by the control signal s, and the FIFO memory 2 gives the period of writing action of video data. This operation is repeated upon every input of each horizontal scanning period, and the video data for one screen are continuously written into the FIFO memory 2.

The output action of the video data is explained. Suppose the video data stored in the FIFO memory 2 is read out in synchronism with the horizontal synchronizing signal of a certain video signal. The FIFO memory 2 receives the vertical synchronizing signal of the video signal, and the FIFO memory 2 is set at the first address. Every time the control unit 1 receives a horizontal synchronizing signal, the counter 4 starts counting up from the set value, and, same as in writing action, the control signal s is delivered as being active from the beginning timing of the horizontal synchronizing signal until the count value reaches the full count and reaches the final bit of the specified number of pieces of video data. The FIFO memory 2 receives this control signal s as a read enable pulse, and sends outs video data sequentially in bit units in synchronism with the clock CK, so that a specified number of video data may be delivered in the written sequence in every horizontal synchronizing signal. By repeating this action in every horizontal synchronizing signal, the video data for one screen is read out as being divided in every horizontal synchronizing signal.

Thus, according to the embodiment of the invention, the video data of video signals are divided in every horizontal scanning period and written into the FIFO memory, and read out in the sequence corresponding to the sampling points in each horizontal scanning period, and moreover by the use of the FIFO memory. Neither address generating circuit nor multiple address transmission lines should be required.

The foregoing description relates to non-standard video signals, but the same holds true, of course, with standard video signals.

Application examples using the video signal memory equipment of the invention are briefly described below.

Figure 4:
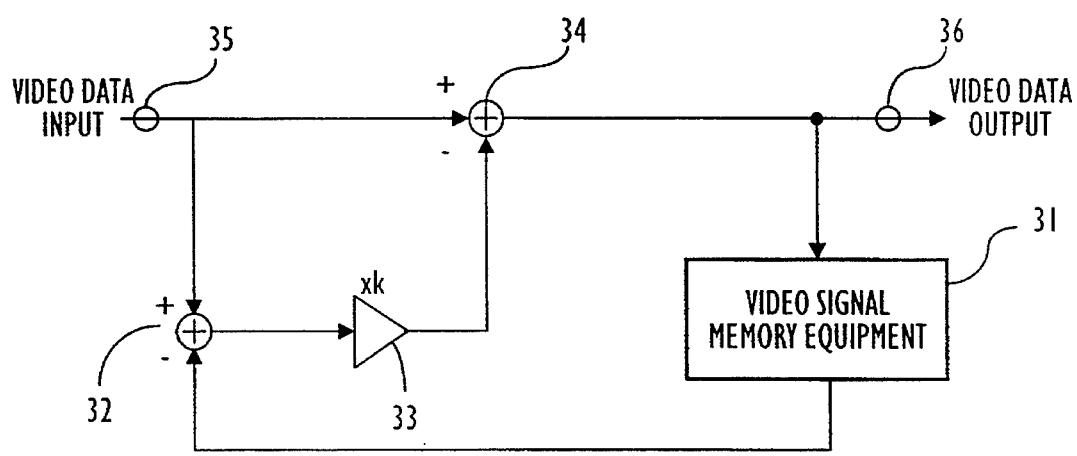
FIG. 4 is a block diagram showing a constitution of an embodiment of a noise reducing circuit using the video signal memory equipment of the invention.

FIG. 4 is a block diagram showing a constitution of a noise reducing device using the video signal memory equipment of the invention. In the diagram, numeral 31 shows the video signal memory equipment of the invention, 32 is an adder for subtracting, 33 is a multiplier for multiplying the output of the adder 32 by k times, 34 is an adder for subtracting, 35 is an input terminal of video data of video signals, and 36 is an output terminal of video data of video signals. In the shown constitution, at the action start point, video data is not stored yet in the video signal memory equipment 31, and there is no output. Therefore, at the first step, when the video data of a first screen are sequentially fed into the input terminal 35, the video data are sequentially written into the video signal memory equipment 31 without any addition in the adder 34. At the next step, the video data of a next screen are sequentially fed, while the video data are sequentially read out from the video signal memory equipment 31, so that the video data produced from the video signal memory equipment 31 are subtracted from the input video data in the adder 33. In this case, there is a close correlation in image between the video data entered in the adder 32 and the immediately preceding video data delivered from the video signal memory equipment, while there is no correlation in the noise component, and therefore the adder 32 delivers only the noise component by subtraction processing. This output is multiplied by k times by the multiplier 33, and the noise component is subtracted from the input video data in the adder 34, and delivered from the terminal 36. Incidentally, by adding a process of determining the mean of the video signals of n screens, the electric power of noise can be lowered to 1/n, and the amplitude to $1/n^2$.

The value of coefficient k in the multiplier 33 is selected in a range of 0<k<1, and in the still picture, the noise can be lowered more when k is selected closer to 1, whereas in the moving picture, blurry Image can be reduced more when k is selected closer to 0.

In the embodiment, since the video data produced by the video signal memory equipment 31 of the invention corresponds correctly to the position on the screen in every horizontal scanning period, its output always matches in the position on the screen with the video data entered from the terminal 35, so that effects of horizontal synchronizing signals will not appear in the result of signal processing between screens.

Figure 5:
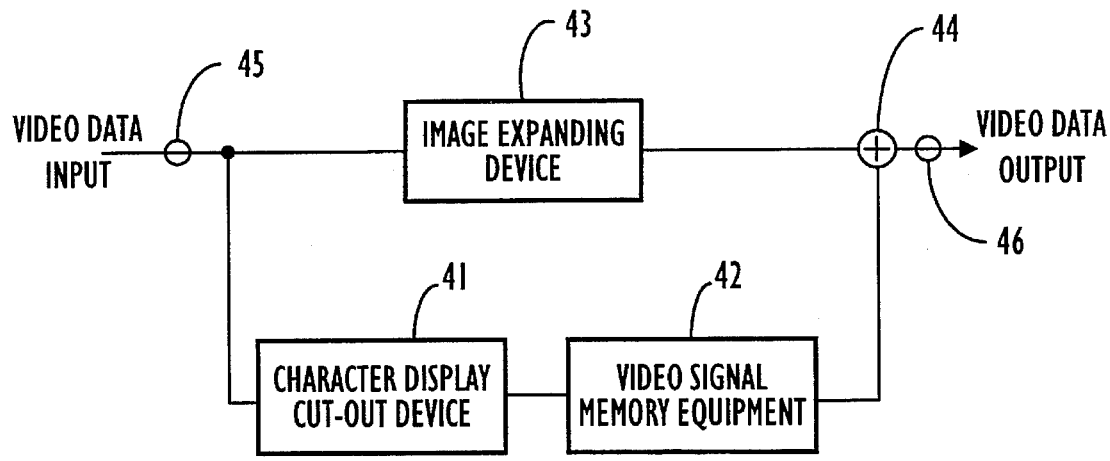
FIG. 5 is a block diagram showing a constitution of an embodiment of a character display processing circuit using the video signal memory equipment of the invention.
Figure 6:
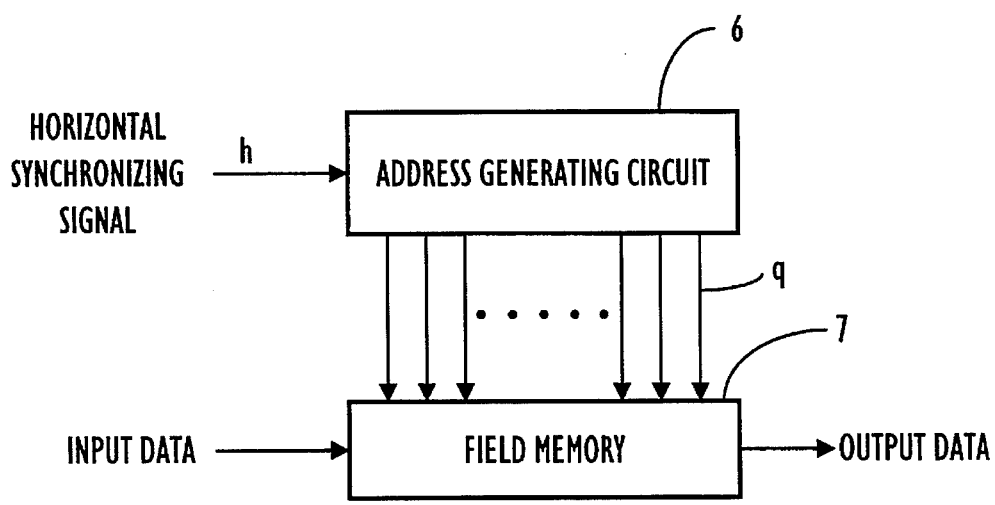
FIG. 6 is a block diagram showing a constitution of a conventional video signal memory equipment.

FIG. 5 is a block diagram showing a constitution of a character display processing device using the video signal memory equipment of the invention. In the diagram, numeral 41 is a character display cut-out device for cutting out the character display from the input video data, 42 is the video signal memory equipment of the invention, 43 is an image expanding device for receiving video data and expanding the aspect ratio, 44 is an adder for adding the output of the image expanding device 43 and output of the video signal memory equipment, 45 is an input terminal of video data, and 46 is an output terminal of video data. In the constitution shown in FIG. 5, at the first step, the character display cut-out device 41 cuts out the character display according to the input video data, and the video signal memory equipment 42 stores the video data of the character display. At the next step, the Image expanding device 43 changes the aspect ratio, for example, from 4:3 to 16:9 on the basis of other input video data, and sends out to the adder 44, while the video signal memory equipment 42 delivers the video data of the stored character display in the adder 44. The adder 44 adds up these video data, overlays the original character display not expanded on the image expanded in the aspect ratio, and produces into the output terminal 46.

In this embodiment, too, since the video data produced by the video signal memory equipment 42 corresponds correctly to the position on the screen in every horizontal scanning period, the output produces the character display in the initial character display position in ever horizontal scanning period of the image expanding device 43.

What is claimed is:
1. Video signal memory equipment comprising:
   a FIFO memory for writing a specified number of video data from the beginning of the video data of video signals per horizontal scanning period into said FIFO memory and reading the written specified video data from said FIFO memory, said FIFO memory having an input for receiving video data to be written, an output for sending out the read video data, another input for receiving a clock signal, a further input for receiving control signals for writing and reading a specified number of pieces of video data per horizontal scanning period according to said clock signal, and a still further input for receiving a vertical synchronous signal; and a control unit for producing said control signals for controlling the writing and reading of said video data in said FIFO memory, said control unit having an input for receiving a horizontal synchronous signal, another input for receiving a clock signal, and an output for sending control signals to said FIFO memory control signal input, said control signals being produced by said control unit in synchronism with every horizontal synchronous signal according to said clock signal;

wherein said FIFO memory writes said specified number of video data from the beginning per horizontal line sequentially at every vertical synchronous signal set by said clock signal into the FIFO memory in response to a write control signal from said control unit, and wherein said FIFO memory reads the specified number of video data per horizontal scanning period in written sequence at every vertical synchronous signal set by said clock signal into the FIFO memory in response to a read control signal from said control unit, thereby storing and producing video data for a video screen.

* * * * *